United States Patent [19]

Asfar

[11] Patent Number: 4,574,657
[45] Date of Patent: Mar. 11, 1986

[54] MOTOR OPERATED HAND TOOL FOR TIGHTENING AND LOOSENING THREADED FASTENERS AND THE LIKE

[76] Inventor: Khaled R. Asfar, Yarmouk University, Irbid, Jordan

[21] Appl. No.: 557,230

[22] Filed: Nov. 30, 1983

[51] Int. Cl.[4] .......................... F16H 3/56; F16H 57/10
[52] U.S. Cl. ....................................... 74/766; 74/784; 74/802
[58] Field of Search .................. 74/802, 355, 784, 766, 74/767, 781 R, 752 B, 352, 353

[56] References Cited

U.S. PATENT DOCUMENTS

| | | | |
|---|---|---|---|
| 1,803,235 | 4/1931 | Cotal | 74/767 |
| 1,905,952 | 4/1933 | Scott | 74/784 X |
| 3,109,325 | 11/1963 | Holtan | 74/767 |
| 3,143,899 | 8/1964 | York | 74/802 X |
| 3,438,284 | 4/1969 | Bentley | 74/766 |
| 3,481,222 | 12/1969 | Baron | 74/802 |

FOREIGN PATENT DOCUMENTS

| | | | |
|---|---|---|---|
| 457955 | 7/1949 | Canada | 74/352 |
| 2713264 | 9/1977 | Fed. Rep. of Germany | 74/802 |
| 422422 | 6/1949 | Italy | 74/802 |
| 57-184742 | 11/1982 | Japan | 74/802 |

OTHER PUBLICATIONS

*Product Engineering*, "Record Gear Ratios", Sigmund Rappaport, p. E88, Jun. 22, 1959.

*Primary Examiner*—Leslie A. Braun
*Assistant Examiner*—Dwight G. Diehl
*Attorney, Agent, or Firm*—Mason, Fenwick & Lawrence

[57] ABSTRACT

A motor operated hand tool for tightening and loosening threaded fasteners and comprising a housing having opposed input and output ends, an input spindle slidably, rotatably mounted in the input end of the housing, and an output spindle rotatably mounted in the output end of the housing. A stationary compound gear set is fixedly mounted inside the housing at the output end coaxial with the output spindle. A driving gear is fixedly mounted to an inside end of the output spindle. A rotatable compound gear set is rotatably coupled to an inside end of the input spindle and has an axis of rotation offset from and parallel to an axis of rotation of the input spindle. The second compound gear set is selectively engageable with the stationary compound gear set and the driving gear.

6 Claims, 2 Drawing Figures

MOTOR OPERATED HAND TOOL FOR TIGHTENING AND LOOSENING THREADED FASTENERS AND THE LIKE

BACKGROUND OF THE INVENTION

1. Field of the Invention

This invention, in its preferred form, relates to motor-operated hand tools and, in particular, a hand tool for tightening and loosening threaded fasteners and the like. More specifically, the tool can be used with any portable, commercial-type drill motor. The tool reduces the speed of the drill motor and is capable of reversing the sense of rotation of the output spindle, while the input spindle always rotates in a clockwise direction.

2. Description of the Prior Art

Tools for tightening fasteners have long been known, as shown in U.S. Pat. Nos. 3,041,902 to Wing, 3,331,269 to Sauter et al., and 3,696,693 to Bosten et al. The tool disclosed by Wing comprises a motor and a simple speed-reduction planetary gear train whose output shaft provides the torque to tighten the fastener. The tool disclosed by Sauter et al. comprises a power section and a drive train which uses two-stage speed reduction. A set of differential bevel pinions is coupled to the power section. The output of the bevel pinions drive a planetary gear train whose output is used to tighten the fastener. The tool disclosed by Bosten et al. comprises a motor, a simple two-pinion gear set driven by the motor, and an output shaft driven by the gear set. The motor shaft and the output shaft are parallel. The motor is located inside the housing in all of these tools.

All of these tools suffer from the primary disadvantage that they can only be used for tightening fasteners, and not for also loosening them. Moreover, they can only be used with specific types of fasteners. Incorporation of the motor into the tool housings limits the use of the motor, while making the tools very expensive. Also, their many moving parts make them subject to breakdown. Apart from these common problems, the tool disclosed by Wing has too low a speed reduction, and the tool disclosed by Bosten et al. requires that the fastener be held against rotation while the tool is used to tighten its retainer.

SUMMARY OF THE INVENTION

It is therefore an object of this invention to provide a new and improved motor-operated hand tool that is capable of both tightening and loosening threaded fasteners and the like.

It is a more particular object of this invention to provide a new and improved motor-operated hand tool which can be used to tighten and loosen different kinds of threaded fasteners.

It is yet another object of this invention to provide a new and improved motor-operated hand tool which can be used in conjunction with a portable, commercial-type drill motor.

It is still another object of this invention to provide a new and improved motor-operated hand tool whose output shank rotates at a speed significantly lower than that of the output shaft of the driving motor.

It is a still further object of this invention to provide a new and improved motor-operated hand tool having few moving parts which are simple in construction.

In accordance with these and other objects of the invention, there is disclosed a motor-operated hand tool for tightening and loosening threaded fasteners and the like. The tool comprises a housing having opposed input and output ends, an input spindle, an output spindle, and a gear train coupling the input spindle to the output spindle. The input spindle is rotatably mounted in the input end of the housing and is slidable between a first and second position, while the output spindle is rotatably mounted in the output end of the housing. The axes of rotation of the input and output spindles are colinear.

In a significant aspect of this invention, the gear train comprises a stationary compound gear set fixedly mounted inside the housing at its output end, a driving gear fixedly mounted to the inside end of the output spindle, and a rotatable compound gear set rotatably coupled to the inside end of the input spindle and selectively engageable with the stationary compound gear set and driving gear.

The axis of rotation of the driving gear is colinear with the axis of rotation of the output spindle, while the axis of rotation of the rotatable compound gear set is offset from and parallel to the axis of rotation of the input spindle. The stationary compound gear set is coaxial with the output shaft.

In a further aspect of this invention, an arm is mounted on the input spindle perpendicular thereto, and a pin is fixedly mounted to the arm parallel to the input spindle. The rotatable compound gear set is rotatably mounted on the pin.

In a further aspect of this invention, a balancing pin is fixedly mounted on the other end of the arm from the mounting pin for balancing the centrifugal force of the mounting pin and the rotatable compound gear set when the arm is rotated.

In a still further aspect of this invention, the input spindle is provided with a reduced-diameter section, and an insert disc is movably mounted on the outside of the housing for engaging the reduced-diameter section for locking the input spindle in its second position.

BRIEF DESCRIPTION OF THE DRAWINGS

A detailed description of a preferred embodiment of the invention is hereafter made with specific reference being made to the drawings in which.

DESCRIPTION OF THE PREFERRED EMBODIMENT

Figure 1:
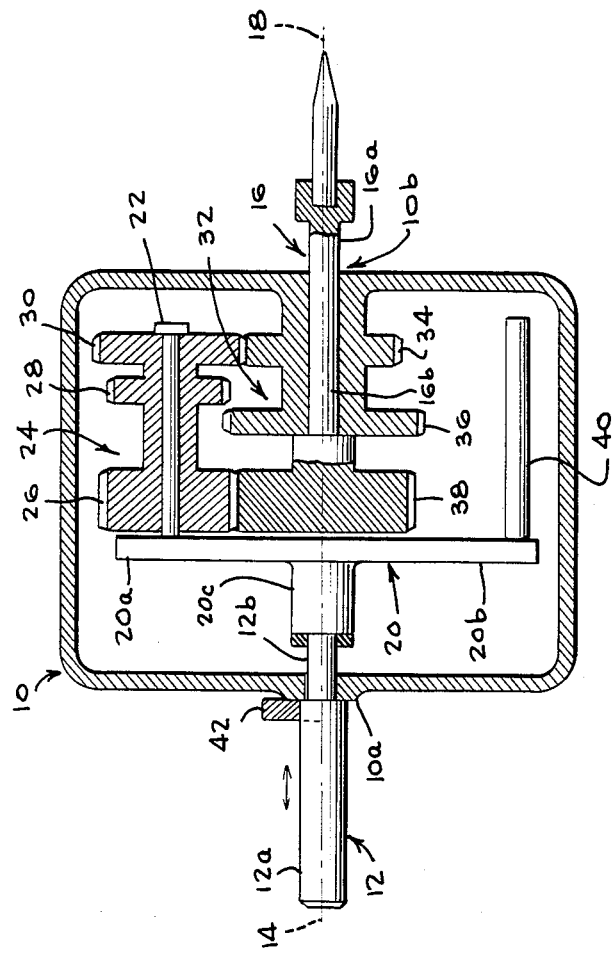
FIG. 1 is a side, cross-sectional view of a motor-operated hand tool in accordance with the present invention.

With reference to the drawings, and particularly to FIG. 1, there is illustrated a motor-operated hand tool in accordance with the present invention. The hand tool comprises a housing 10 having an input end 10a and an output end 10b. An input spindle 12 is slidably, rotatably mounted at input end 10a of housing 10. Input spindle 12 includes an outside end 12a and an inside end 12b. Input spindle 12 is slidable between a first and second position. In its first position, outside end 12a extends outside of housing 10 and inside end 12b extends inside housing 10. In its second position, a portion of inside end 12b adjacent outside end 12a extends outside housing 10. Preferably, inside end 12b has a smaller diameter than outside end 12a, for a purpose to be described hereinafter. Input spindle 12 rotates in housing 10 about an axis of rotation 14.

An output spindle 16 is rotatably mounted in output end 10b of housing 10. Output spindle 16 includes an outside end 16a extending outside of housing 10 and an inside end 16b extending inside housing 10. Output spindle 16 rotates in housing 10 about an axis of rotation 18. Axis of rotation 14 of input spindle 12 and axis of rotation 18 of output spindle 16 are colinear.

A base 20 comprising a pair of oppositely extending arms 20a and 20b is fixedly mounted to inside end 12b of input spindle 12, perpendicular to input spindle 12. Base 20 preferably is mounted to input spindle 12 by a cylindrical neck 20c having a diameter greater than the diameter of inside end 12b. A pin 22 is in turn fixedly mounted to arm 20a perpendicular thereto and offset from input and output spindles 12 and 16.

A compound gear set 24 is rotatably mounted on pin 22. Gear set 24 comprises gears 26, 28 and 30, which rotate together. The diameter of gear 28 is smaller than that of gear 30, the diameter of gear 26 being intermediate between the two. Gear 26 is mounted on pin 22 adjacent arm 20a. Gear 30 is mounted at the opposite end of pin 22, and gear 28 is intermediate gears 26 and 30, being spaced apart further from gear 26 than from gear 30. Gear set 24 is movable between first and second positions corresponding to the first and second positions of input spindle 12.

A stationary compound gear set 32 comprising gears 34 and 36 is fixedly mounted inside housing 10 at output end 10b, coaxial with inside end 16b of output spindle 16. Gear 36 is larger in diameter than gear 34. Gears 34 and 36 are positioned so that gear 34 is engaged by gear 30 when gear set 24 is in the first position and gear 36 is engaged by gear 28 when gear set 24 is in the second position.

A gear 38 is fixedly mounted on inside end 16b of output spindle 16, spaced apart from gear 36. Gear 38 can alternatively be formed integrally with spindle 16. The diameter of gear 38 must be smaller than that of gear 36, and preferably is larger than that of gear 34. Gear 38 also is sized to be engaged by gear 26. Both gears 26 and 38 have a large face width, so that they remain engaged whether gear set 24 is in the first or the second position.

The number of teeth on gears 26-30 and 34-38 depends upon the desired speed reduction ratio between the output chuck of the motor (not shown) and output spindle 16. For example, a speed reduction ratio of 10:1 can be achieved in both directions with the following number of teeth:

Gear 26: 19
Gear 28: 19
Gear 30: 20
Gear 34: 19
Gear 36: 22
Gear 38: 20

The speed reduction ratio is calculated according to the following formula: for each revolution of input spindle 12, output spindle 16 will rotate $$\left(1 - \frac{N_{34}}{N_{30}} \times \frac{N_{26}}{N_{38}}\right) \text{ revolutions,}$$

where $N_{34}$, $N_{30}$, $N_{26}$, and $N_{38}$ represent the number of teeth on gears 34, 30, 26 and 38, respectively.

In order to balance the centrifugal force due to rotation of pin 22 and gear set 24, arm 20b is provided with a pin 40. Balance can be achieved by placing pin 40 at a sufficient distance from the axes of rotation 14 and 18 of spindles 12 and 16, as shown in FIG. 1, or by providing it with equivalent weights (not shown).

Figure 2:
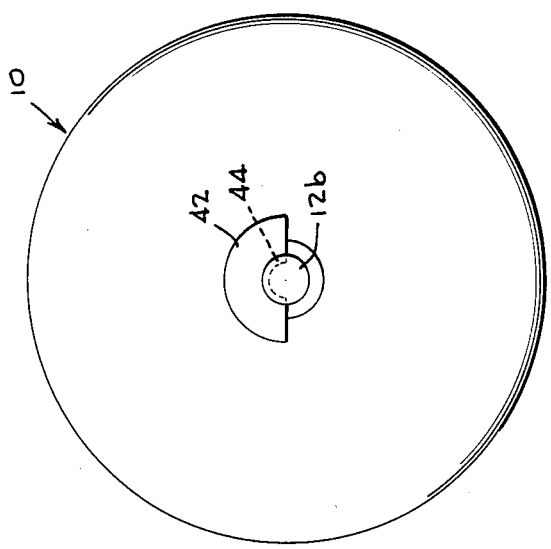
FIG. 2 is a partial elevational view of the input end of the motor-operated hand tool.

Referring now to FIG. 2, input spindle 12 is locked in the second position by an insert 42 movably mounted to the outside of housing 10 at input end 10a. Insert 42 has a semicircular aperture 44 having the same diameter as inside end 12b. When spindle 12 is in the second position with a portion of inside end 12b extending outside housing 10, insert 42 is moved downwardly so that aperture 44 engages inner end 12b.

In use, the hand tool of the present invention is placed between the motor drill and the fastener to be tightened or loosened, with input spindle 12 engaging the output chuck of the motor and output spindle 16 engaging the fastener. If the fastener is to be tightened, input spindle 12 is placed in the first position, that is, with inner end 12b inserted all the way into housing 10. This causes gear 30 to engage gear 34. Housing 10 is prevented from rotating during operation of the motor drill by the operator's hand. The clockwise rotation of the motor drill check induces clockwise rotation of input spindle 12 and base 20. As base 20 rotates, gear set 24 is driven in a counterclockwise direction by gear 34 of gear set 32. Because gear 38 is larger in diameter than gear 34, it is driven in a clockwise direction by the rotation of gear 26, causing output spindle 16 also to rotate in a clockwise direction.

The tightening torque is checked by the operator, who stops the motor and releases the tool from the fastener when he feels that the fastener is properly tightened.

To loosen a fastener, input spindle 12 is moved into the second position. Input spindle 12 is locked in the second position by insert 42, as described above. When input spindle 12 is moved into the second position, gear 30 is disengaged from gear 34 and gear 28 engages gear 36. Clockwise rotation of the motor chuck again causes input spindle 12 and base 20 to rotate clockwise. Gears 26 and 28 are now driven in a counterclockwise direction by gear 36 of gear set 32. Because gear 36 is greater in diameter than gear 38, gear 38 is also driven in the counterclockwise direction. Consequently, output spindle 16 rotates counterclockwise.

In considering this invention, it should be remembered that the present disclosure is illustrative only, and that the scope of the invention should be determined by the claims appended hereto.

I claim:

1. A motor operated hand tool for tightening and loosening threaded fasteners and the like, comprising:
    (a) a housing having opposed input and output ends;
    (b) an input spindle slidably, rotatably mounted in said input end of said housing, said input spindle having an outside end outside said housing, an inside end inside said housing, and an axis of rotation, said outside end adapted to be driven by a motor rotating in a fixed, first direction;
    (c) an output spindle rotatably mounted in said output end of said housing, said output spindle having an inside end inside said housing and an outside end outside said housing, and an axis of rotation colinear with said axis of rotation of said input spindle;
    (d) a stationary compound sun gear set fixedly mounted inside said housing at said output end coaxial with said output spindle;

(e) a driven sun gear fixedly mounted to said inside end of said output spindle and having an axis of rotation colinear with said axis of rotation of said output spindle; and (f) a rotatable compound planetary gear set rotatably coupled to said inside end of said input spindle and having an axis of rotation offset from and parallel to said axis of rotation of said input spindle, said rotatable compound planetary gear set comprising first and second gears, said rotatable compound gear set and said input spindle moveable together between a first position, wherein said first gear engages a third gear of said stationary compound sun gear set and said rotatable compound planetary gear set engages said driven sun gear to rotatively drive said output spindle in said first direction, and a second position, wherein said second gear of said compound planetary gear set engages a fourth gear of said stationary compound sun gear set and said rotatable compound planetary gear set engages said driven sun gear to rotatively drive said output spindle in a second direction opposite to said first direction, said housing being manually graspable to facilitate the selective disposition of said input spindle and said rotatable compound planetary gear set in one of said first and second positions.

2. The hand tool as claimed in claim 1, wherein said stationary compound sun gear set comprises said third gear adapted to selectively engage said first gear when said rotatable compound gear set and said input spindle are in their first position, and a said fourth gear adapted to selectively engage said second gear when said rotatable compound gear set and said input spindle are in their second position.

3. The hand tool as claimed in claim 2, wherein said fourth gear has a diameter greater than that said driven gear.

4. The hand tools as claimed in claim 3, wherein the diameter of said driven gear is greater than that of said third gear.

5. The hand tool as claimed in claim 1, wherein said rotatable compound planetary gear set further comprises a driving gear for rotatably engaging said driven gear in each of said first and second positions.

6. The hand tool as claimed in claim 5, wherein each of said driving and driven gears having teeth of a dimension sufficient to permit engagement with each other in both of said first and second positions.

* * * * *